Jan. 31, 1967  S. V. BEASLEY  3,301,170
ELECTRIC BROILER
Filed May 11, 1964  3 Sheets-Sheet 3
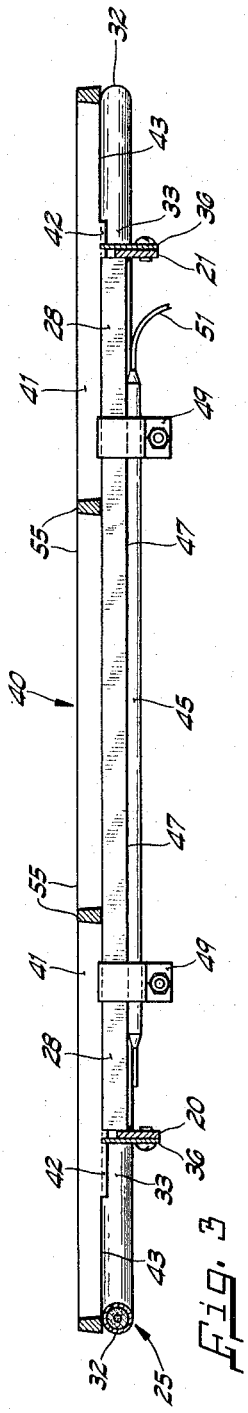
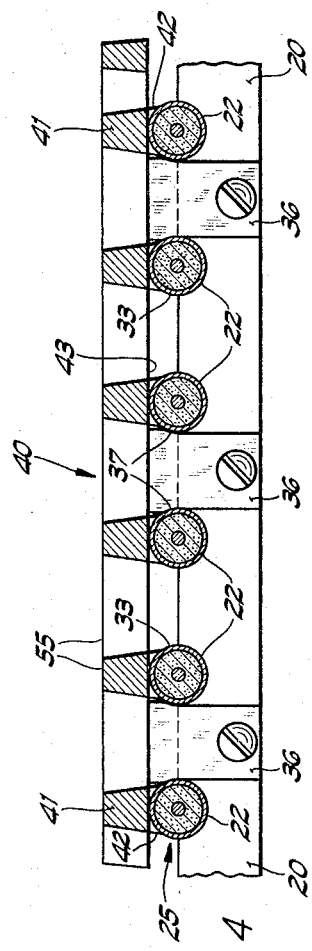
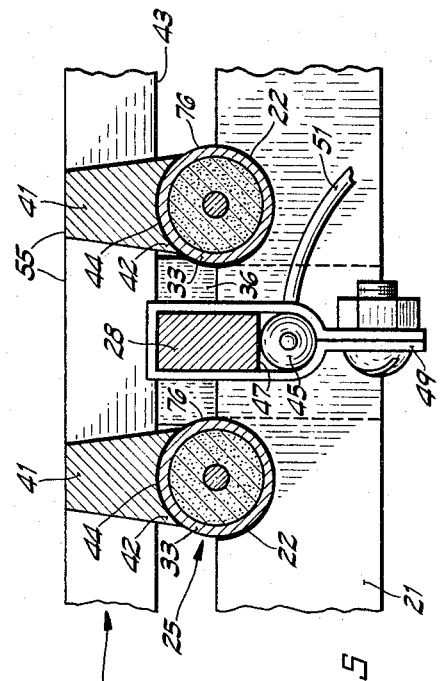
INVENTOR.
Silas V. Beasley
BY Robert W. ...........
Attorney United States Patent Office 3,301,170
Patented Jan. 31, 1967

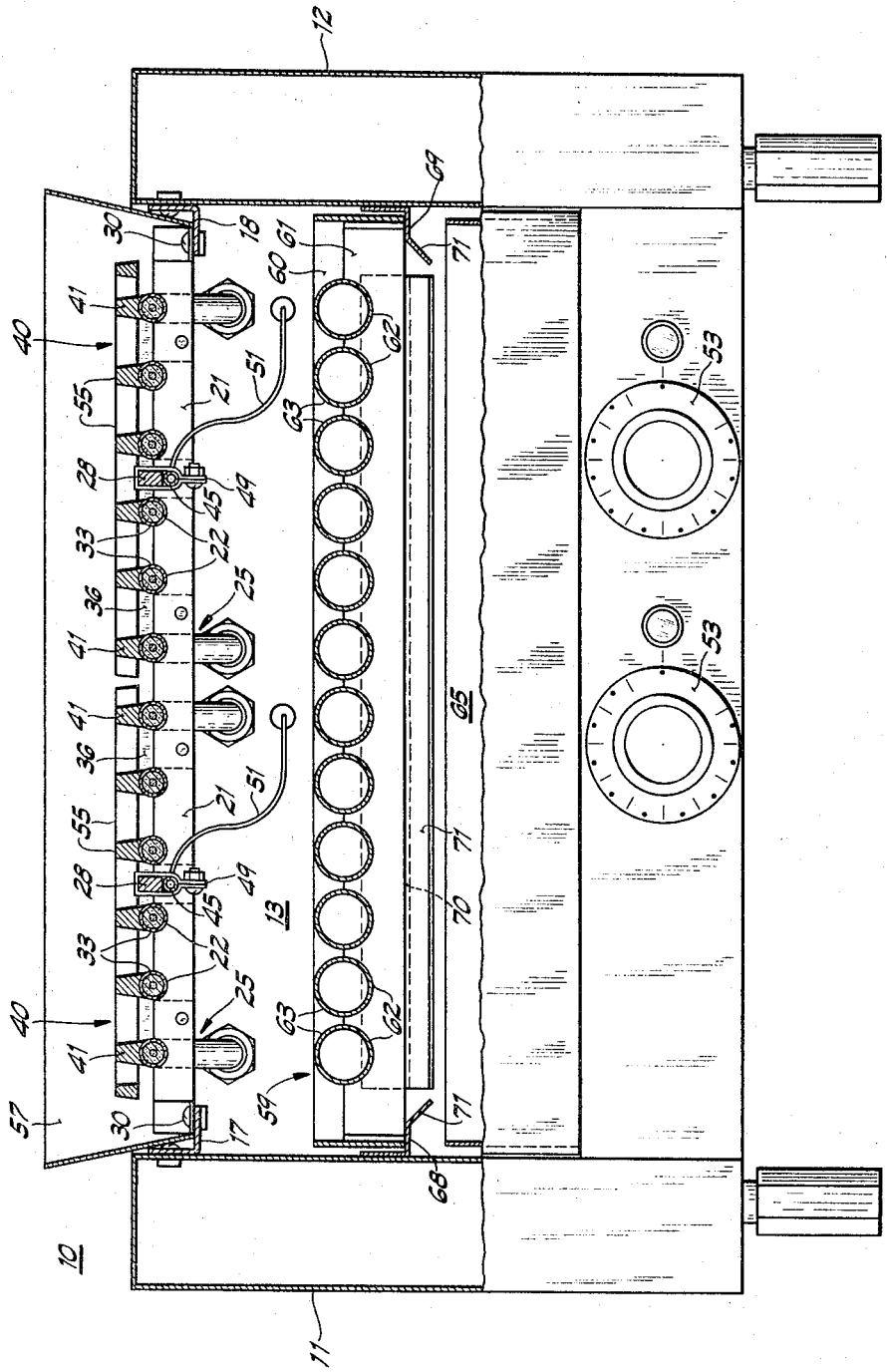

3,301,170
ELECTRIC BROILER
Silas V. Beasley, Algonquin, Ill., assignor to McGraw-Edison Company, Milwaukee, Wis., a corporation of Delaware
Filed May 11, 1964, Ser. No. 366,411
6 Claims. (Cl. 99—331)

This invention relates to food preparing apparatus and more particularly to an electric broiler.

It is the purpose of a broiler of the type described herein to provide a device wherein food may be broiled on a grate of heated metal bars to produce a cooked meat product having the appearance and flavor of meat broiled on a charcoal broiler. This is achieved by a proper temperature at the cooking surface of the grate and causing a portion of the drippings from the meat to burn and vaporize thereby providing an atmosphere of smoke and vaporized fats to impart the characteristic charcoal broiled flavor.

Some existing units utilize heating elements that serve as a grid while others use a grid with radiant units therebelow. When the elements are used simultaneously as the heat source and as a grid the corrosive action of the drippings from meat and other food tends to markedly shorten element life. If the heating element is placed below the grid it has usually required greatly elevated heating element temperatures to achieve a proper temperature at the cooking surface with the high temperature elements representing a fire hazard with respect to collected drippings as well as those coming from the food presently being cooked.

Generally it has also previously not been possible to achieve an accurate thermostatic control of the cooking surfaces or to provide a practical limitation of the maximum heating element temperatures to avoid the likelihood of flash fires while maintainning sufficiently exposed heating surfaces to burn and vaporize a portion drippings to achieve the desired flavor of the broiled meats. It has been found that an optimum broiling condition exists when a grid surface temperature of approximately 700 degrees Fahrenheit is maintained.

It is an object of this invention to provide an improved broiler structure for effectively delivering heat to the broiling surface.

It is a further object of this invention to provide a broiler with an accurately controlled broiling surface temperature.

It is a further object of this invention to shield the heating elements of a broiler from the corrosive effect of a major portion of the drippings released by the cooked food while still imparting the charcoal broiled flavor to the food being broiled.

It is also an object of this invention to provide a device for effectively limiting the maximum temperature of the heating elements of a charcoal broiler to reduce the fire hazard.

These and other objects and advantages of this invention will become apparent from the following description when taken in connection with the accompanying drawings wherein:

FIGURE 2 is a front elevation of the broiler of FIGURE 1 with the upper portion broken away and in section;

FIGURE 3 is a section along line 3—3 of FIGURE 1;

FIGURE 4 is a section taken along line 4—4 of FIGURE 1; and

FIGURE 5 is a section taken along line 5—5 of FIGURE 1.

Figure 1:
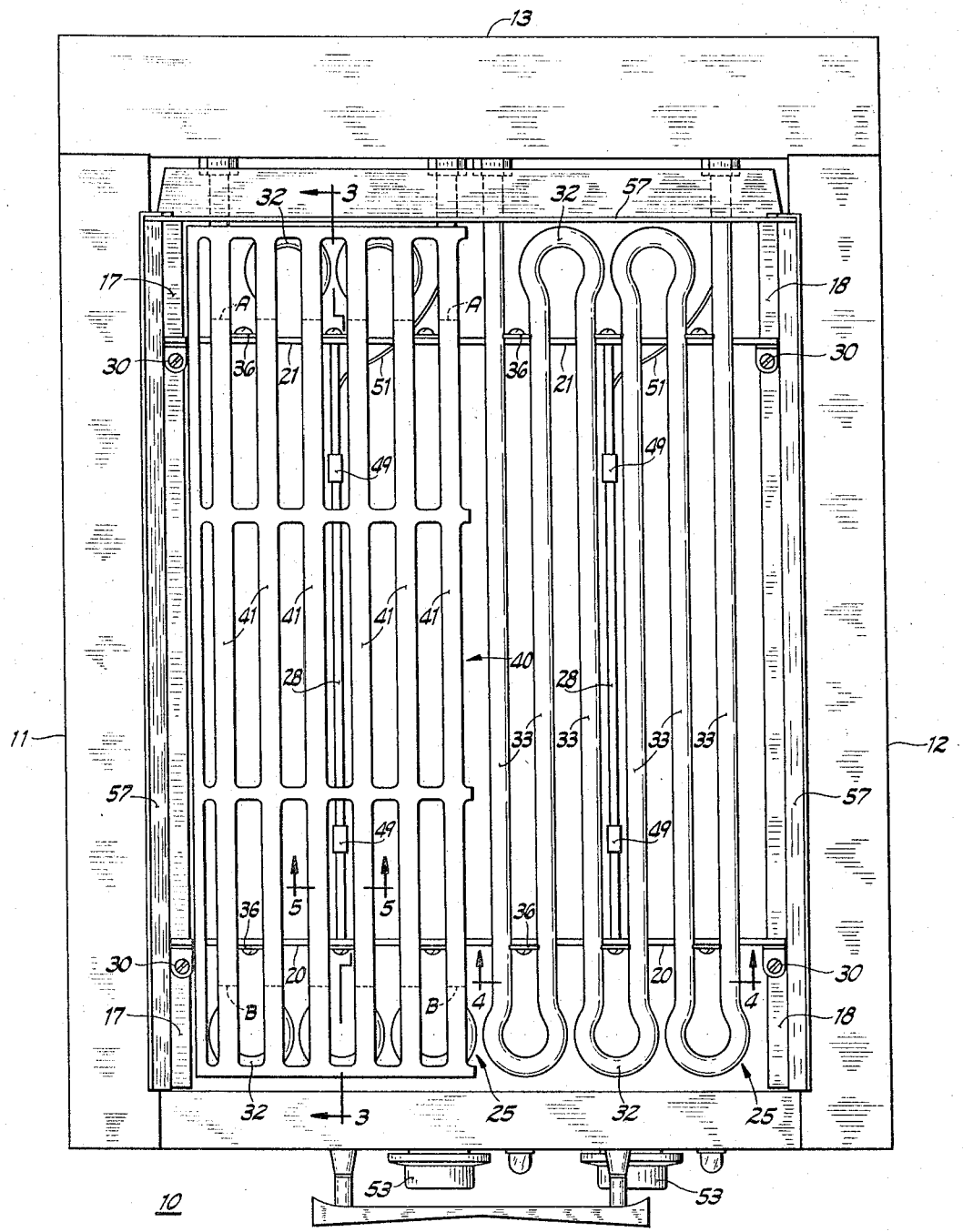
FIGURE 1 is a plan view of a preferred embodiment of this invention.

Referring to FIGURES 1 and 2 the broiling unit is supported within a housing 10 having double wall side walls 11 and 12 and a double wall rear wall 13. The sides 11, 12 have support angles 17 and 18 respectively secured thereto. Molded to the angles 17, 18 and extending therebetween are a pair of element supports 20 and 21 which are formed of strip material and have a series of semi-circular cutout portions 22 opening toward the upper edge surface thereof. The cutouts 22 are horizontally spaced in a predetermined relation to receive and support the metal sheathed heating element 25. A pair of bar members 28 extend between and are at the ends thereof welded to the element supports 20, 21 to form a unitary support structure that is secured to the angle structure 17, 18 by a series of bolts 30.

The heating elements have terminal portions (not shown) within the rear wall of housing 10 and extend therefrom upwardly into the broiling area where they are formed into a co-planar serpentine configuration. The generally U-shaped end portions 32 are formed in a reentrant curved configuration to bring the adjoining pairs of parallel straight co-planar intermediate heating element portions 33 into a more closely horizontally spaced relation than the minimum acceptable bending radius for the sheathed heating element would provide. In addition this configuration provides a slightly increased heat concentration at the front and rear of the broiling area.

The elements are retained in the support member cutouts 22 by a series of hold-down tabs 36 which are bolted to the support 20 and each of which present outwardly flanged upper transverse edge surfaces 37 (FIG. 4) which engage the periphery of the adjoining heating element portion 33 to hold the element in engagement with the semicircular edge surface of the respective coutout portion 22.

A cast grid member 40 rests on and is solely supported by the heating element 25. The grid has a series of longitudinally extending bar members 41 which have a horizontal spacing identical to that of the heating element portions 33. The bar portions 42 between the dotted lines A and B (FIG. 1) depend below the horizontal lower surface 43 of the grid 40 and present a curvate lower surface 44 that conforms to the upper surface of the heating element portions 33 thereby affording good conductive heat receiving contact. In addition these depending portions position the grid 40 with respect to the heating element 25 in the transverse direction and almost completely shield the vertical projection of the straight parallel spaced heating element portions 33. The balance of the grid lower surface 43 is horizontal and in the same plane as the uppermost surface of the co-planar broiling portions of the heating element 25 such that the heating element is in contact with the grid 40 wherever it overlies the heating element 25.

In addition to providing structural rigidity and positive spacing of support members 20, 21 each bar 28 carries a thermostat sensing element 45 which is secured in conductive heat receiving contact against the lower surface 47 of the bar by a pair of encircling straps 49 (FIGURES 3 and 5). Each of the sensing elements 45 is connected by a capillary tube 51 to one of a pair of thermostatic control mechanisms (not shown) which is of conventional design and disposed within the housing 10. Each thermostat controls the temperature of one heating element 25 and in the illustrated embodiment through the medium of rotating one of the calibrated knobs 53 thereby serves to control the temperature of the upper grid surface 55 of half the broiling surface. The knobs 53 are calibrated to be indicative of the upper or broiling surface 55 of the respectively associated grid 40.

About the heating elements 25 and grids 40 is a spatter shield 57 (shown only in FIG. 2). Below the grids 40 and elements 25 is a radiation shield 59 formed of a surrounding frame 60 to which are connected a pair of horizontally spaced reflector tube supporting members 61 with semi-circular upwardly opening cutout portion 62 for supporting a series of polished metal reflector tubes 63. Reflector tubes 63 serve to reflect downwardly radiated heat to both concentrate heat in the broiling area and prevent overheating of drippings which accumulate in the grease drawer 65 underlying the radiation shield 59. The tubes 63 are transversely spaced to provide, in addition to heat reflection, a clearance between adjacent tubes to allow drippings to pass into the grease drawer 65. The radiation shield 59 is supported on housing 10 by angle members 68, 69 at each side and 70 at the rear, each of which angle members has a downwardly turned edge 71 to divert drippings to the grease drawer 65.

In operation the bar 28 which is substantially co-planar with the adjacent straight parallel electrical element portions 33 (FIG. 5) is in the path of direct radiation of the heating element portions 33 and the temperature sensing element 45 is in conductive heat receiving relation with the bottom surface of bar 28. The grid bars 41 are in conductive heat receiving overlying relation to the element portions 33. Although the temperature sensing element 45 receives direct radiation from the heating element portions 33, in normal operation while a grid surface temperature is being maintained the principal heat delivered to the heat sensing element 45 is by conduction from bar 28 and the sensing element and the associated thermostat regulate the flow of electrical energy to the elements 25 to maintain the preselected temperature at the upper surface 55 of the grid.

If for any reason the element portions 33 rise markedly in temperature and become overheated the radiant heat discharge from element portion 33 to the sensing element becomes dominant and overrides the influence of heat conducted from the bar 28. In such circumstances the thermostat will interrupt current flow to the associated heating element 25 irrespective of the grid surface temperature. It will thus, be seen that the thermostat unit functions not only to maintain a desired grid surface, but also acts as a limit switch to avoid the fire hazard caused by an overheated element. This limiting function does not lengthen the warm-up time for the unit since no cycling occurs during this period because there is a sufficiently great heat dissipation to prevent overheating of the element.

By way of example the above results are achieved with a 7/16 inch diameter heating element, having parallel horizontally spaced portions on one inch centers, the upper grid surface 11/32 inch above the heating element and a cold rolled steel bar 3/8 inch in height and 7/32 inch in width with the upper surface of the bar co-planar with the uppermost surface of the adjacent heating element portions.

When broiling on the grid surface the elements 25 are substantially shielded from drippings throughout the major portion of the exposed length thereof, but a sufficient exposed area exists along the almost vertical sidewall portions 76 of element portions 33 to afford the burning and vaporization of drippings necessary to impart the characteristic charcoal broiled flavor to the meat.

Although but one embodiment has been shown and described it will be apparent to those skilled in the art that various changes and modifications may be made therein without departing from the spirit of the invention or from the scope of the appended claims.

What is claimed is:

1. An electric broiler comprising a tubular metal sheathed heating element presenting a co-planar generally serpentine pattern including a series of parallel horizontally spaced element portions and a metal article supporting grid supported solely on said sheathed heating element with parallel bar portions respectively overlying said parallel horizontally spaced element portions and having a co-planar lower surface in heat conducting supporting contact with said heating element co-planar pattern at each location where said grid overlies said heating element co-planar portions, said grid parallel bar portions having depending portions presenting curvate bottom surfaces conforming to said underlying parallel spaced heating element portions to increase surface contact and position said grid with respect to said heating element in a transverse direction, said element portions interconnecting adjoining parallel element portions having initially diverging portions joined to one another by a closed curved portion whereby said portions interconnecting said parallel element portions deviate from a wholly underlying relation with respect to said grid at positions lacking increased surface contact between said element and grid to thereat provide increased direct heat radiation to the cooking surface of said grid.

2. A cooking apparatus comprising a series of co-planar parallel horizontally spaced metal sheathed electrical heating element portions; thermostat means for regulating the supply of electricity to said heating element portions including an elongated temperature sensing element; an elongated bar member disposed between two adjoining heating element portions of said series of heating element portions and in horizontal spaced relation therefrom with a bottom surface adjacent the plane established by the lowermost portions of said heating element portions and connecting means securing said elongated temperature sensing element in contacting conductive heat receiving relation to said bottom surface of said bar.

3. An electric broiler comprising tubular metal sheathed electrical heating element means presenting a series of parallel co-planar horizontally spaced element portions; a metal article supporting grid supported by said heating element means having horizontally spaced parallel bar portions with lower surfaces conforming to and in thermo-conductive support receiving contact with said parallel spaced element portions and thermostat means for regulating the supply of electricity to said heating element means including an elongated temperature sensing element and a bar member extending between adjacent element portions and horizontally spaced therefrom with said elongated temperature sensing element secured to the bottom of said bar in conductive heat receiving relation thereto.

4. An electric broiler comprising a tubular metal electrical heating means presenting a series of parallel co-planar horizontally spaced element portions; a metal article supporting grid supported by said heating element means having horizontally spaced parallel bar portions with lower surfaces conforming to and in thermo-conductive support receiving contact with said parallel spaced element portions; thermostat means for controlling the supply of electricity to said heating element means including an elongated temperature sensing element and a bar member extending in generally parallel horizontally spaced relation between adjoining heater element portions and presenting a bottom surface and means securing said elongated temperature sensing element to the lower surface of said bar member in conductive heat receiving relation to said bar, said bar partially shielding said temperature sensing element from direct radiation from said adjoining heating element portions.

5. An electric broiler comprising a tubular metal sheathed heating element means presenting a series of parallel co-planar horizontally spaced element portions; a metal article supporting grid in heat conductive overlying contacting relation to said heating element means; thermostat means for regulating the supply of electricity to said heating element means including a heat sensing element; a bar member supported in horizontal spaced relation between a central adjacent pair of said parallel co-planar heating element portions with a height approximately co-extensive with the vertical height of said adjacent pair of heating element portions and means securing said heat sensing element to the bottom surface of said bar member in heat conductive relation thereto, said heat sensing element having the major portion thereof disposed below the plane established by the lowermost surfaces of said adjacent pair of heating element portions.

6. An electric broiler comprising a tubular metal sheathed heating element formed in a serpentine pattern and presenting a series of coplanar horizontally spaced element portions; a metal article supporting grid having parallel horizontally spaced portions in overlying heat conductive supported relations respectively to said parallel spaced element portions, said bar portion having curvate bottom surface portions conforming to the element portion surfaces contacted thereby to overlie a major portion of the vertical projection of said element portions; a metal bar member extending in substantially parallel spaced relation intermediate a centrally located adjacent pair of said series of parallel spaced heating element portions with upper and lower surfaces respectively approximately co-planar with the upperomst and lowermost surface portions of said pair of heating element portions; a thermostat for regulating the supply of electrical current to said heating element including an elongated temperature sensing element and connecting means securing said temperature sensing element to said bar member lower surface in conductive heat receiving relation thereto with said bar member being of sufficient width to partially shield said temperature sensing element from direct radiation emitted by said adjacent pair of heating element portions.

References Cited by the Examiner
UNITED STATES PATENTS

| | | | |
|---|---|---|---|
| 2,856,502 | 10/1958 | Wolf | 99—445 X |
| 3,023,298 | 2/1962 | Wells. | |
| 3,166,006 | 1/1965 | Lennox | 99—446 |
| 3,225,682 | 12/1965 | Savio | 99—446 |

WALTER A. SCHEEL, *Primary Examiner.*

S. P. FISHER, *Assistant Examiner.*